(12) United States Patent
Lawler, III et al.

(10) Patent No.: US 10,759,650 B2
(45) Date of Patent: Sep. 1, 2020

(54) AUTOMATED ENGINE OIL CHANGE SYSTEM AND METHOD

(71) Applicants: Joseph F. Lawler, III, Lakeway, TX (US); Grant T. Lawler, Lakeway, TX (US); Joseph F. Lawler, Jr., Lakeway, TX (US)

(72) Inventors: Joseph F. Lawler, III, Lakeway, TX (US); Grant T. Lawler, Lakeway, TX (US); Joseph F. Lawler, Jr., Lakeway, TX (US)

( * ) Notice: Subject to any disclaimer, the term of this patent is extended or adjusted under 35 U.S.C. 154(b) by 141 days.

(21) Appl. No.: 16/125,072

(22) Filed: Sep. 7, 2018

(65) Prior Publication Data
US 2020/0079640 A1    Mar. 12, 2020

(51) Int. Cl.
| | | |
|---|---|---|
| B67D 7/04 | (2010.01) | |
| B25J 13/06 | (2006.01) | |
| G06Q 20/14 | (2012.01) | |
| F01M 11/04 | (2006.01) | |

(52) U.S. Cl.
CPC ............... B67D 7/04 (2013.01); B25J 13/06 (2013.01); F01M 11/0458 (2013.01); G06Q 20/14 (2013.01)

(58) Field of Classification Search
CPC .............. B67D 7/04; B67D 2007/0444; B67D 2007/0455; B67D 2007/0459; B25J 13/06; B25J 13/089; B29C 66/863; B65F 2230/14; F01M 11/0458
USPC .................................................. 141/86, 350
See application file for complete search history.

(56) References Cited

U.S. PATENT DOCUMENTS

| | | | | |
|---|---|---|---|---|
| 3,720,287 A * | 3/1973 | Martel | ............... | F01M 11/0458 184/1.5 |
| 4,776,430 A * | 10/1988 | Rule | ............... | F01M 11/0408 137/539 |
| 4,951,723 A * | 8/1990 | Hoeptner, III | ..... | F01M 11/0408 141/346 |
| 5,588,502 A * | 12/1996 | Bedi | ............... | B03C 1/286 141/98 |
| 5,765,612 A * | 6/1998 | Morin | ............... | F01M 11/0408 137/614.05 |
| 5,862,222 A * | 1/1999 | Gunnarsson | ......... | B67D 7/0401 340/5.42 |
| 6,286,626 B1 | 9/2001 | Evans | | |
| 6,397,811 B1 * | 6/2002 | Marsh | ............... | F01M 11/0458 123/196 R |
| 7,946,159 B2 * | 5/2011 | Despres | ............... | G01G 17/06 73/114.52 |

(Continued)

OTHER PUBLICATIONS

TETRIX Max Tank Tread Kit Description, www.pitsco.com PITSCO Education, Dec. 2018.

(Continued)

Primary Examiner — Timothy L Maust
(74) Attorney, Agent, or Firm — Remenick PLLC

(57) ABSTRACT

The present invention encompasses a system and method for automatically replacing vehicle fluid, such as engine oil, with a robotic serving unit or robotic machine. The robotic machine comprises a motorized, autonomously maneuverable unit that has on its top a drainage arm to connect with an oil drain plug of a vehicle. In a preferred embodiment, the oil drain plug comprises a hollow interior for the drainage arm to connect with and drain the oil, and can also comprise a sealable element to retain the oil.

9 Claims, 12 Drawing Sheets

(56) References Cited

U.S. PATENT DOCUMENTS

| | | | |
|---|---|---|---|
| 7,980,335 B2 | 7/2011 | Potter | |
| 8,164,302 B2 * | 4/2012 | Capizzo | B60L 53/305 320/109 |
| 10,514,088 B2 * | 12/2019 | Bassis | F16H 57/0405 |
| 2013/0292918 A1 | 11/2013 | Schlee | |
| 2016/0236657 A1 * | 8/2016 | Erwin | F16H 57/0408 |

OTHER PUBLICATIONS

ANDYMARK Stealth Wheels, https://www.andymark.com/Sealth-Wheels-p/am-stealthwheel.htm , Dec. 2018.
CJ Mag, Shanghai CJ Magnet Industry Co., Ltd., http://www.gimpguru.org/pz605e131-cz52f3af6-high-performance-ring-neodymium-magnets-used-in-motor-and-speaker.html, Dec. 2018.
HiLetgo RFID kit, http://www.amazon.com/HiLetgo-RFID-Kit-Arduino-Raspberry-dp-B01CSTW0IA/ref=sr_1_4?ie=UTF8&qid=1527455822&sr=8-4&keywords=rfid+sensor&dpID=41%252BHYO%252Bn2EL&preST=_SY300_QL70_&dpScr=srch , Dec. 2018.

* cited by examiner

AUTOMATED ENGINE OIL CHANGE SYSTEM AND METHOD

BACKGROUND AND INTRODUCTION TO THE INVENTION

The invention relates to an automated system or apparatus for changing fluid in a vehicle, especially the engine oil in a vehicle. In one aspect, the vehicle is parked in a parking lot and identified by a robotic system either at the request of the vehicle owner, a timing or calendar device, or a remote sensor signal of the condition of the existing engine oil. Once identified, a robotic device moves into position near the vehicle, inserts a tube into an existing valve in the oil pan drain plug, removes the oil, and then replaces the oil. The robotic device contains reservoirs for used oil and one or more types of clean engine oil. A payment system and account database monitors the oil change activity and charges the vehicle owner or customer for the service through the use of a host computer. The system conveniently changes the engine oil while the customer is away from the vehicle. In another aspect, the invention relates to an oil drain plug that can be used in conjunction with the automated system or apparatus. This oil drain plug is used to put the oil in the vehicle in fluid communication with a robotic or other system for automating the removal of spent or used oil and/or its replacement with fresh oil. The oil drain plug can include a hollow internal conduit that is controlled by insertion of a drain arm on the robotic system once correctly positioned near the vehicle.

Routine vehicle maintenance, such as an oil change, requires taking time to visit an establishment and then waiting. For most individuals, this is not considered an entertaining or desirable aspect of using a motor vehicle. Systems that can perform the maintenance automatically and while the vehicle owner is not operating the vehicle would be advantageous in relieving the owner of both visiting an establishment and waiting for the service to be completed.

SUMMARY OF THE INVENTION

The invention includes a system for changing the engine oil of a target motor vehicle (TMV) involving: a computer-based customer identification and processing unit for storing and transmitting customer identification data in a computer database; a robotic servicing unit operatively connected to the identification and processing unit, where the robotic unit moves to a vehicle for servicing the vehicle upon receipt of an authorization signal, and where the robotic unit contains one or more tubes for inserting into an existing oil pan drain bolt or plug in the vehicle for removing and adding oil, the robotic unit further containing storage reservoirs for used oil and one or more types of replacement engine oil; and a signal communicator for directing the robotic unit to a specified vehicle and receiving information from and controlling the robotic unit, and for producing a signal authorizing payment and approving servicing for the vehicle.

In one aspect, authorization and identification for servicing and billing is transmitted by means of a first signal produced by a unit in the vehicle or by the customer. For example, the customer can select a date for an oil change and park the vehicle in a pre-determined parking lot. Alternatively, the signal can be sent from a device in the vehicle itself while it is within a pre-determined distance from the robotic unit. A second, separate signal is transmitted to the robotic unit to order the oil change and identify the vehicle. The second signal begins the control of the actual oil change service, which includes initiating and terminating the oil change and optionally the selection of oil type for the vehicle.

In another aspect, an alternative ordering and billing signal are provided at the robotic unit by the customer. The customer can then pay in advance for the oil change and select the type of oil and input information on the vehicle. In another embodiment, the type of oil is selected or confirmed from the vehicle manufacturer's information available and then used to replace the vehicle engine oil.

In a further aspect of the invention, the automatic servicing unit includes an automatic oil dispenser for supplying oil to the vehicle, which includes an inserting tube that pairs with an existing oil pan drain plug that allows the tube to be inserted. In other aspects, the invention includes a pump or means for transferring oil from a storage reservoir to the oil pan of the vehicle, the transfer including a moveable dispensing head and associated nozzle or tip or tube, guidance means for directing the dispensing head and nozzle toward the oil pan drain plug, and optionally an engagement device for locking and disengaging the nozzle and the oil pan drain plug to avoid spills. The reservoirs (6) shown in the Figures are an example of the number and configuration possible. However, many other shapes, configurations, and numbers of reservoirs can be selected in designing the automatic servicing unit. Furthermore, the reservoirs can be operably connected to holes or fluid exchange valves on the top or other surface of the servicing unit to simplify the flow of fluid in to or out of one or more of the reservoirs. The Figures should not be taken as a limitation on the design options for the automatic servicing unit or robotic machine of the invention.

The invention in another aspect comprises a system for changing the engine oil of a motor vehicle using a customer identification and processing unit for storing and transmitting customer identification data, and then sending an authorization signal to a robotic machine or servicing unit. The robotic unit comprises a drainage arm and tube for inserting into an existing oil drain plug of a vehicle and a pump for at least replacing oil, and storage reservoirs for the used oil. The robotic unit is directed to a vehicle and by receiving information from a central controller or computer, which can also control the robotic unit. The system can also employ a novel oil drain plug that comprises a sealable opening and a hollow interior to allow the flow of fluid from one elongated end of the plug to the other, and wherein the exterior bolt head section on one elongated end of the oil drain plug can be connected to a drainage arm of the robotic unit, so that oil can flow into and out of the vehicle. Generally, the drain plug contains in its hollow interior a resistance device to seal a plugging device against the opening of the drain plug when the drainage arm is not connected to the drain plug at the exterior bolt head section. The drainage arm and tube of the robotic unit can be precisely positioned to connect to the oil drain plug by motors on the robotic unit, extendable tubes on the drainage arm, telescoping tubes, or similar mechanisms. Other aspects of the invention are described below.

DETAILED DESCRIPTION

Figure 1:
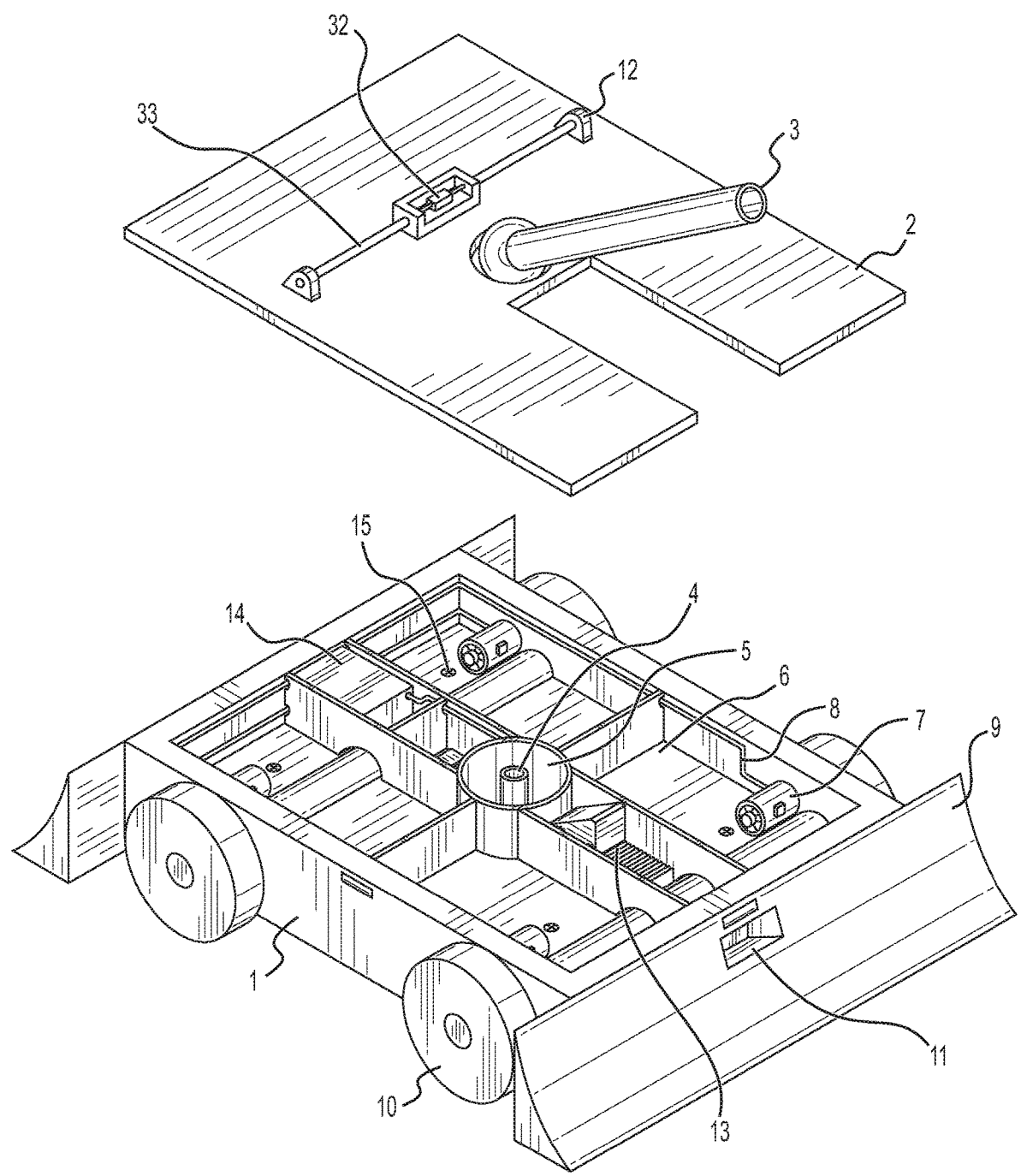
FIG. 1 is an exemplary robotic machine of the invention, where the drain arm (3) is shown extended in the top view, and the lower view shows the reservoirs (6) inside the machine with the top (2) removed.

The system of the invention (autonomous or semi-autonomous) changes the oil in a motor vehicle and generally encompasses the following functions or elements: a unit to identify the target motor vehicle (TMV); a mechanism to propel the oil change robotic unit itself to the TMV; a positioning unit to correctly position the robotic unit beneath the vehicle so it can access the oil drain plug; a mechanism to remove oil from the TMV; a compartment or storage reservoir into which the spent oil is stored; at least one fresh oil compartment or storage reservoir; and a pumping unit to remove spent oil and/or install fresh oil. In one embodiment, the oil can be drained by gravity and an air vent or displacement vent.

Once the oil is changed on the TMV, the system can then seek the next target motor vehicle or may optionally be housed in a rest station in which it can recharge, refill with oil, and discharge spent oil. The robotic unit can visit the rest station between oil changes if desired or useful.

One object of the system and method of this invention can effect an oil change autonomously. The customer, or owner of the motor vehicle, need not be present and a mechanic is not required. In one example, the system can identify the target motor vehicle by means of a specific pre-selected parking place where the target motor vehicle is parked. If the target motor vehicle (TMV) is always present in the same physical location (i.e., the same parking space) then finding the TMV is self-explanatory and the system retains in its database the location of that TMV. The system can optionally contain a license plate reader and identify the TMV amongst a plurality of other motor vehicles by reading the license plates. Car dealerships, community parking lots, sports and entertainment venue parking lots, and employee parking lots are just some examples where a license plate reader can be used. The robotic oil change unit can also be dropped off at the customer's or owner's location or home and from there effect an oil change as if it were in a parking lot. The robotic oil change unit has an onboard processor, one or more cameras or sensors for positioning the robotic movement and directing movement, or for identifying vehicles, and optionally an onboard computer memory device.

For correctly positioning the robotic unit beneath the car, the apparatus or system can affect an oil change by correctly positioning the robotic unit beneath the TMV. To do this, the robotic unit can identify fixed points from which it can calculate or deduce the proper location to begin the oil change. Fixed points include tires, bumpers, oil pan, oil drain plug, and other fixed points on motor vehicles known to those skilled in the art. Because every model of motor vehicle has fixed specifications, the machine of the present invention can read in the correct location from data storage or a memory device, optionally stored in a host computer in communication with the robotic machine or in the robotic machine itself.

In one embodiment, the oil drain plug of the TMV has been replaced with a custom one that facilitates identification as well as oil drainage/replacement steps. One option for the custom drain plug is a ball valve so that it is not necessary to screw/unscrew the oil drain plug. This apparatus would be pre-installed on the TMV and is not likely to spill oil. Another option allows the identification to easily occur on an unmodified TMV via automated video interpretation, ultrasonic detection, sonar, lidar, and other methods. Another option is a modified TMV that contains one or more identifying markers placed on it in advance to facilitate proper positioning of the robotic oil change unit beneath the car. Such identifying markers can include stickers, RFID tags, and physical way points such as uniquely identifiable nuts, bolts, washers, and other forms (metal, plastic).

For changing the oil or vehicle fluid, the system identifies the oil pan drain bolt, which is optionally modified with markings, tags, stickers or RFID labels or tags, and then inserts a tube into it. The drain arm or tube removes and directs the oil to the spent oil reservoir. A vent for air to flow in and out, thereby facilitating oil drainage by gravity or by pump, can be incorporated into the system, for example in the drain arm or the conduits for oil in the robotic machine. After waiting for a certain amount of time to ensure a substantial amount of oil has been drained from the TMV, the robotic oil change unit directs the flow of fresh oil into the engine. Finally, the robotic oil change unit withdraws the tube from the vehicle having effected an oil change. Again, with a custom ball valve for the oil drain plug it is not necessary to screw/unscrew the oil drain plug and this method is not likely to spill oil.

In one example, the oil pan drain plug aspect of the invention is designed to replace the vehicle's current drain plug. The drain plug is optionally modified to facilitate its spatial location by the machine or apparatus of the present invention. In part, the drain plug allows the removal and replacement of fluid without disconnecting or removing the drain plug from the vehicle or the oil pan. Alternatively, a specially designed oil pan with no drain plug but instead a connection point for the drainage arm and tube of the robotic machine of the invention can be designed and used.

The machine or apparatus of the present invention accomplishes several tasks with the end goal being the removal and replacement of fluid from a vehicle. A first step lies in identifying the target vehicle whose fluid needs to be changed. Vehicles are uniquely identified by government and/or manufacturer identifiers. In the case of a car or truck, a license plate or vehicle identification number (VIN) serves this purpose. A unique identification may not be necessary provided the target vehicle can be distinguished from other vehicles in the area. In the case where the location of the target vehicle is known, the robotic machine of the present invention can navigate to the target vehicle location using navigation algorithms contained on the machine or an external navigation systems, such as global positioning system (GPS) inputs, or other methods of positioning known to those skilled in the art including, but not limited to, RADAR, LIDAR, infrared sensing, etc. In the case that the target vehicle's exact location is unknown, for example, in a parking lot, the robotic machine of the present invention could identify the location of the target vehicle using a camera to identify the vehicle's unique identifier e.g. license plate. A different beacon or identifier may also be placed on the target vehicle to facilitate its identification. Another option is to embed within the drain plug a tag or beacon that can be sensed remotely and which encodes a unique identifier of the target vehicle. Whether the target vehicle is located in a known position or is identified by the robotic machine of the present invention, the machine moves itself in the proper position in order to drain or replace fluid of the target vehicle. Various automated guided vehicles or robots can be used to design the robotic servicing unit of this invention, i.e. U.S. Pat. Nos. 10,001,799, and 9,902,069.

To drain or replace the fluid contained in the target vehicle the robotic machine of the present invention possesses a system by which it can move. This system should be sufficiently robust so that it can locate itself near the target vehicle and sufficiently precise such that it can position itself properly to facilitate a fluid change. A wide variety of methods are capable of moving the machine of the present invention, these include, treads, wheels, or rollers. See, for example, US 20130292918 or U.S. Pat. No. 7,980,335.

In the case where the robotic machine of the present invention must avoid obstacles en route to the target vehicle it may optionally possess software to help it avoid obstacles and or markings such as a flag so that it can be avoided by potential hazards, such as a vehicle.

Once the target vehicle has been located, the machine of the present invention positions itself beneath or within reach of the target vehicle. In positioning beneath the target vehicle, the robotic machine of the present invention can position itself precisely under the target vehicle such that the machine of the present invention can transfer fluid between itself and the target vehicle, and vice versa. The machine of the present invention can accomplish this by either directly positioning itself under the vehicle's fluid drain or by positioning itself nearby the vehicle's fluid drain and then move to the vehicle's drain by using predetermined measurements.

Figure 15:
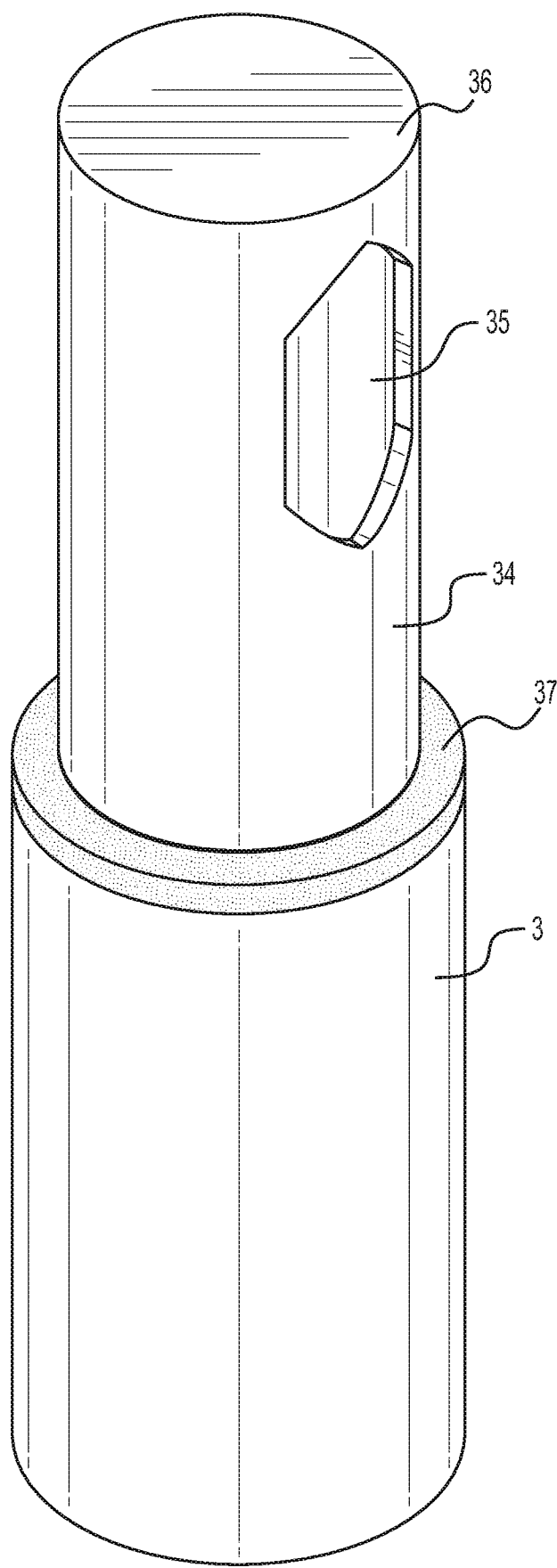
FIG. 15 shows an exemplary drainage arm tip or drain tube, designed to fit into and connect with a corresponding drain plug.
Figure 16:
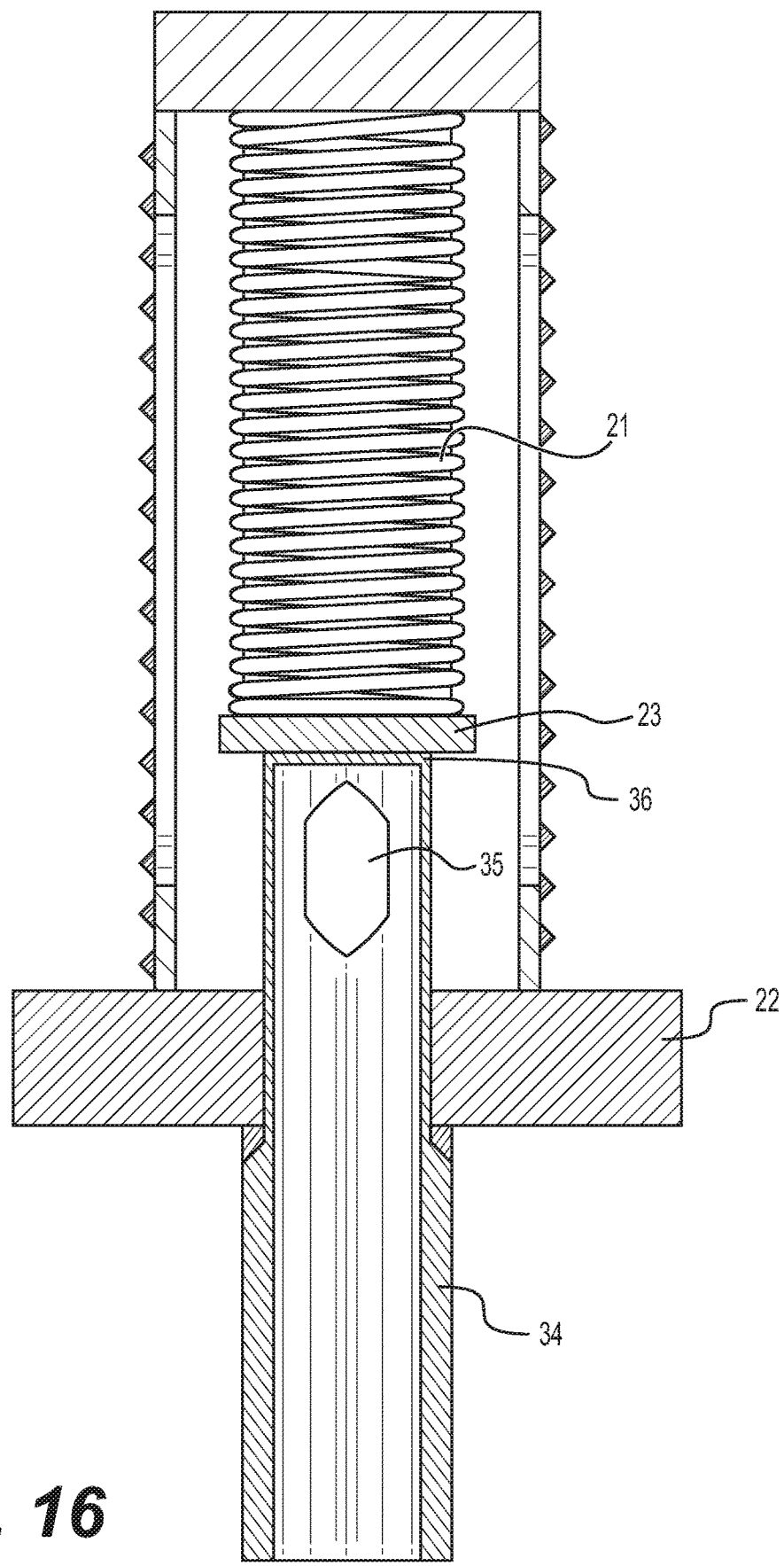
FIG. 16 shows a partial cut-away view of the drain tube of FIG. 15 connected to a corresponding drain plug.

An extension of the drain arm of the machine of the present invention can be used in order to drain or replace vehicle fluid. The machine of the present invention possesses a system by which the fluid from the target vehicle or machine of the present invention can be transferred. The system should minimize leakage during the transfer of fluid. An example of a system would be an arm that extends from the machine of the present invention and connects with the target vehicle's drain plug such that a seal is created between the arm of the machine of the present invention and the target vehicle's oil drain plug. The machine of the present invention could accomplish the task of connecting with the target vehicle's drain through several available methods, including the following methods: connecting with a plug; magnetic tip or ring especially high power magnets like neodymium magnets; magnetic washers or gaskets or high power magnets like neodymium; a RFID sensor; or suction. FIGS. 15 and 16 show an exemplary connection to the drain plug and the components shown can be constructed of high power magnetic materials or can contain RFID tags and sensors to improve the precise connection point at the drain plug.

The arm can be extended in a variety of angles, from completely perpendicular to the ground to a more shallow angle depending on the orientation of the drain plug. A motor on the robotic machine controls the angle of the drainage arm and extension of the drainage arm and/or its extension tube for connecting to the oil drain plug. The drain arm may optionally contain a valve that can direct the draining fluid to a specific chamber within the machine of the present invention. The valve may also prevent spent and replacement fluid from mixing.

The drainage or replacement of the vehicle fluid from target vehicle may be accomplished by draining into a chamber contained in the robotic machine of the present invention, or a containment vessel, or a bag contained in the robotic machine of the present invention.

Fresh fluid can be added by means of a pump. The pump is run until such time as an adequate amount of fresh fluid has been added to the target vehicle. An adequate amount of fluid can be measured directly by the pump or indirectly by monitoring the weight of the machine or reservoir used in the present invention. The drain arm of the machine of the present invention can then be removed from the drain plug and placed in a position that facilitates the movement of the machine of the present invention out from under the target vehicle. The machine of the present invention then contains spent fluid or oil, which may optionally be disposed of before repeating the next fluid change on a new target vehicle. Data can be collected throughout this process to facilitate its improvement, collect vehicle and customer information, as well as other information on the process.

The robotic oil change unit may reside in a small station between oil changes, where it can discharge spent oil into a container and refill with new oil, especially oil specific for the vehicle whose oil is to be changed next.

In another aspect, the customer servicing system embodying features of the present invention involves a system employing a robotic oil change apparatus that electronically identifies a vehicle when the vehicle is within a predetermined distance of the robot rest station, authorizes a transaction by a customer from a database remotely communicating with the robot, performs the oil change, and then authorizes a charge to the customer's account. The system includes a host computer to store account information and service and vehicle information. Preferably, the computer is connected to the internet and account information can be accessed by customers over the internet.

Turning to the description of the Drawings, FIG. 1 shows a partially exploded view of the robotic machine (1) with its top cover (2) removed. The drainage arm (3) is positioned on the top and is used to insert into the drain plug, shown for example in FIGS. 7 and 10. The control of the drainage arm (3) is dictated by the type, make and model of the vehicle, and the position of the angle and length of the drainage arm can be controlled by telescoping tubes and/or by motors so that the end of the drainage arm (3) can be inserted into a drain plug.

Figure 5:
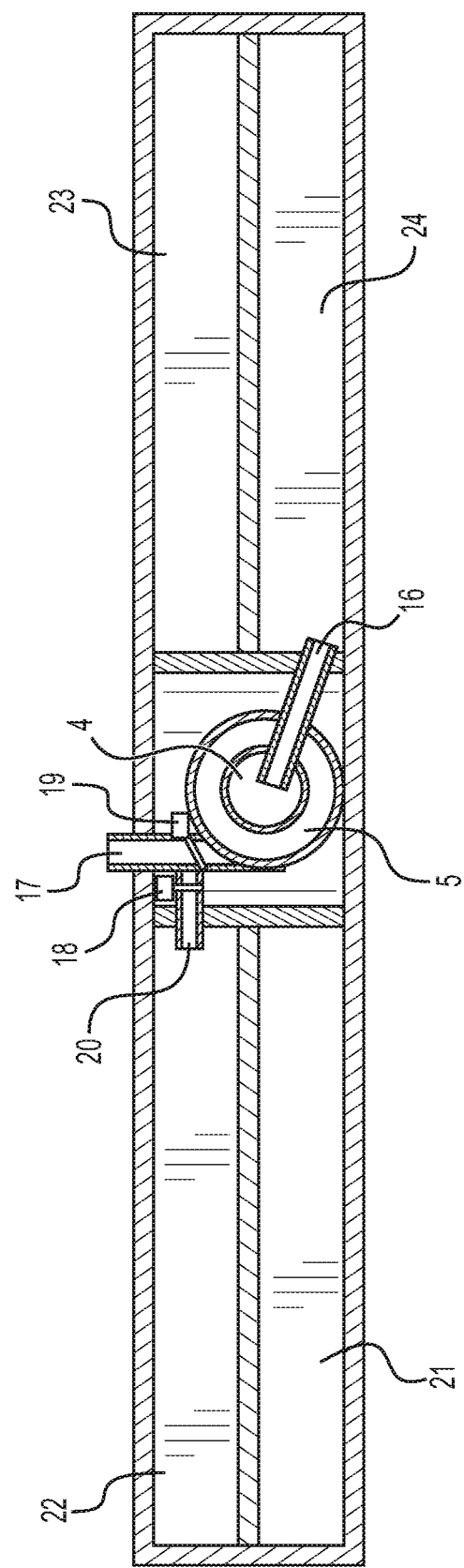
FIG. 5 is a close-up, cut-away view of an interior section of the machine of FIG. 1.

In FIG. 1, central conduit to pump (4) is in fluid communication with the drainage arm (3) so that fluid or oil can be safely removed from the vehicle oil pan. Additional conduits, not shown, direct the inflow of spent oil into one of the storage reservoirs (6). Each of the other of the four reservoirs (6) shown in FIG. 1 can be filled will fresh oil, and the exemplary depiction of four reservoirs in FIG. 1 is not limiting. Any convenient number of reservoirs can be used and accommodated into a desired robotic machine as designed according to the invention. A central pump (5) is connected to each reservoir (6) for conducting fluid or oil into or out of that reservoir (6). The central section of the robotic machine (1) is shown in more detail in FIG. 5. FIG. 5 is a cut-away view of the pump and valve central section of the robotic machine, as described below. In FIG. 5, the specifics of the conduit (17) into the interior of central conduit to pump (4) is shown in more detail.

The robotic machine (1) is typically on wheels (10) controlled by motors housed within, as shown in motors (7) and power supply wires (8) directed to each motor. A battery (14) powers the motors as well as the central pump (5) and the device for controlling the movement of the drainage arm (13). Exterior protective barriers (9) ensure that the robotic machine does not encounter anything in its course, and sensors or an electronic eye (11) can be used to confirm the direction or path to the target vehicle and avoid obstacles. Additionally, a camera (32) mounted on the top surface (2) can be used to, for example, identify a target vehicle, the position of the robotic machine, or the drainage arm (3) in relation to the drain plug, and/or confirm the identity of the target vehicle. Braces (12) and slide bar (33) allow the camera (32) to move along the top surface (2) and rotate if desired. The motor for moving the camera is not shown in FIG. 1. Drainage holes (15) can be found in each reservoir (6) to allow the spent oil to be drained, for example, when the robotic machine returns to its station.

Figure 2:
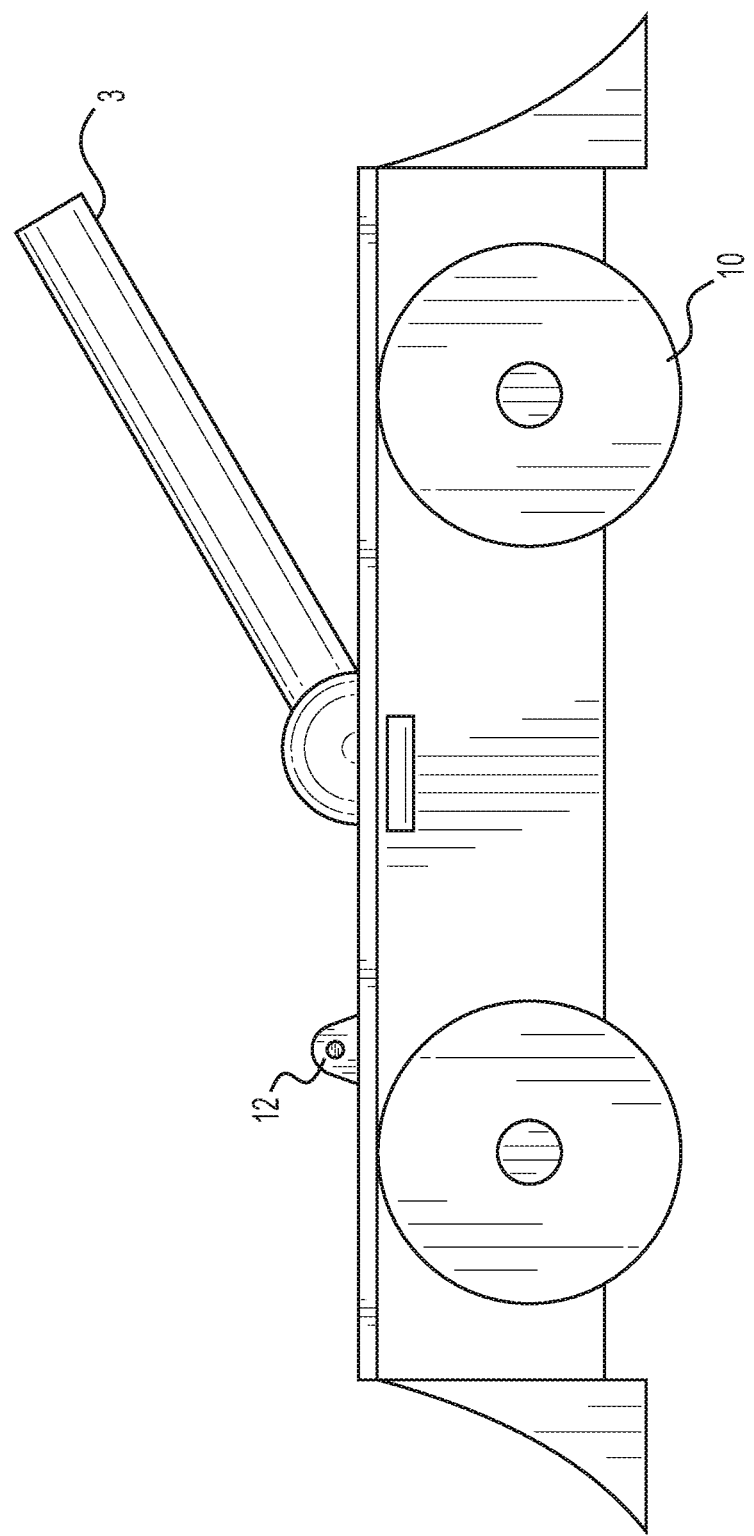
FIG. 2 is a side view of the robotic machine of FIG. 1.

FIG. 2 shows a side view of the robotic machine (1) with top (2) and drainage arm (3) attached. The side of brace (12) is also visible, along with wheels (10). While wheels are depicted here, tracks, combinations of tracks and wheels, and other propulsion devices or systems can be selected for use.

Figure 3:
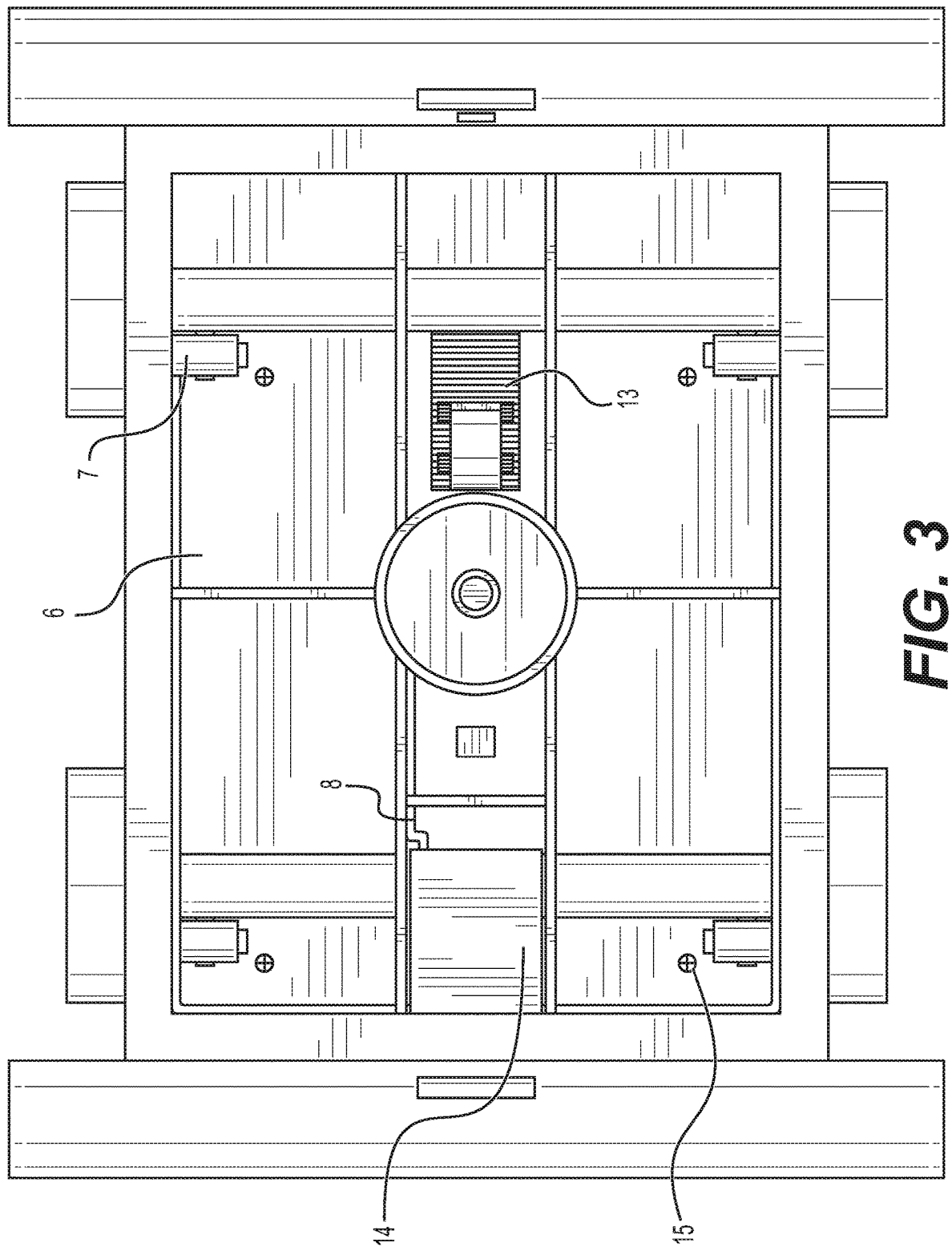
FIG. 3 is a close-up view of the interior of the robotic machine of FIG. 1.

FIG. 3 shows a view looking down into some of the internal elements of the robotic machine (1) of FIG. 1. The battery (14), wires (8), drain holes (15) motors (7), reservoirs (6), and device for moving the drainage arm (13) are all shown.

Figure 4:
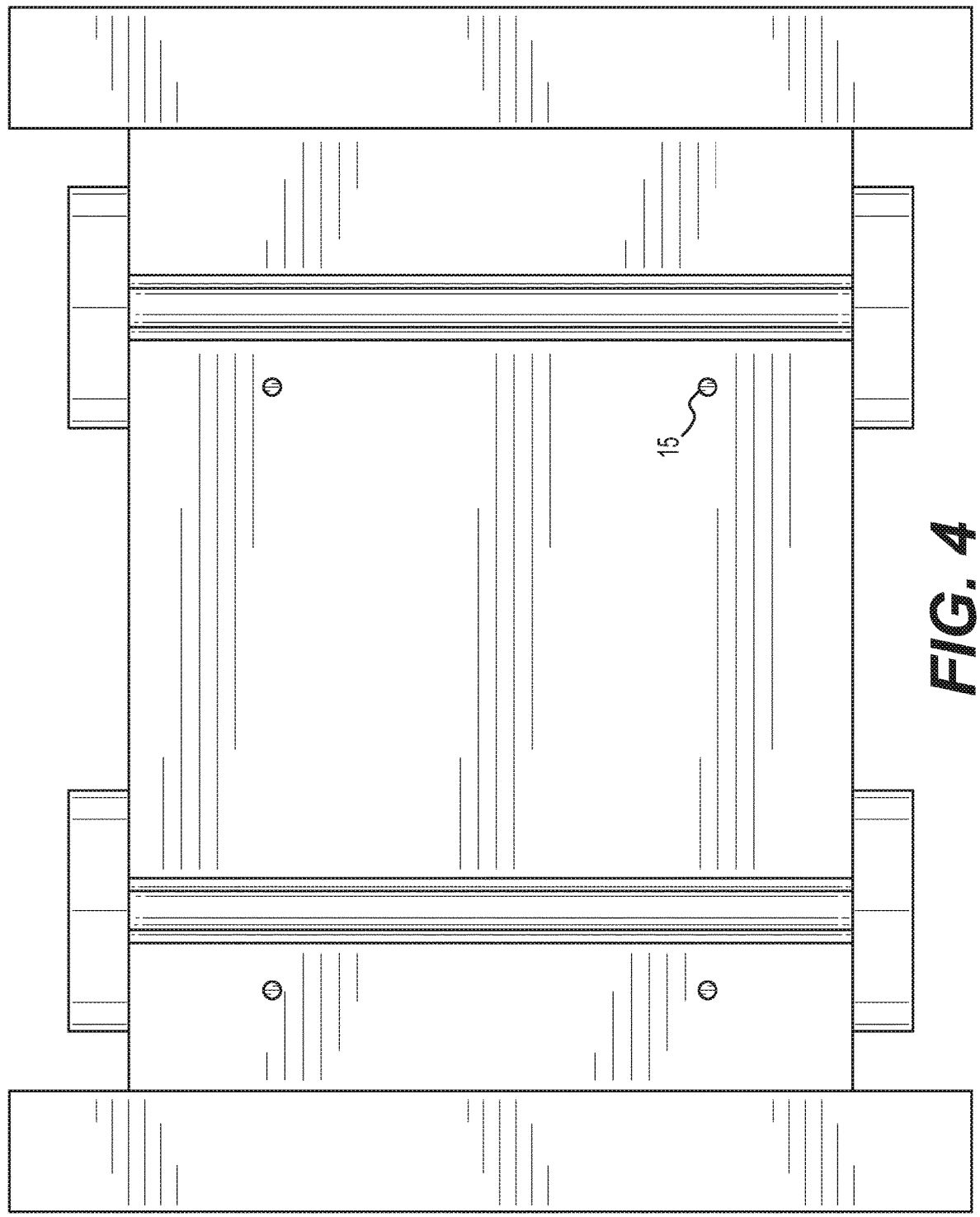
FIG. 4 is a bottom view of the robotic machine of FIG. 1.

FIG. 4 shows a bottom view of the robotic machine. Here, four drain holes (15) are shown, allowing each of the four reservoirs to drain. The wheels (10) are also shown.

FIG. 5 shows an isolated view of the central section of the robotic unit (1) of FIG. 1, with a cut-away view of the central section with the pump (5). The central pump unit (5) is connected to a central conduit (4) that allows fluid to be directed to or from different directions or reservoirs based on the direction of the flow spout and the operation of valve #1 and valve #2. Valve1 (18) on the left of FIG. 5 allows spent oil to flow into one of the reservoirs by preventing the flow of spent oil out conduit (20), for example. Conduit (17) is connected to the drainage arm (3) and when draining or filling oil to the vehicle connected to the drain plug. Valve2 (19) allows fresh oil to be pumped from a reservoir into the vehicle. Each of the multiple possible reservoirs can be dedicated to receiving spent oil or holding fresh oil. Conduit (16) connects the pump (5) to a fresh oil reservoir to pump fresh oil out conduit (17) after the robotic machine has drained the spent oil. While FIG. 5 depicts an exemplary two valves and two conduits into or out of the pump, embodiments with additional conduits and valves can also be used.

Figure 6:
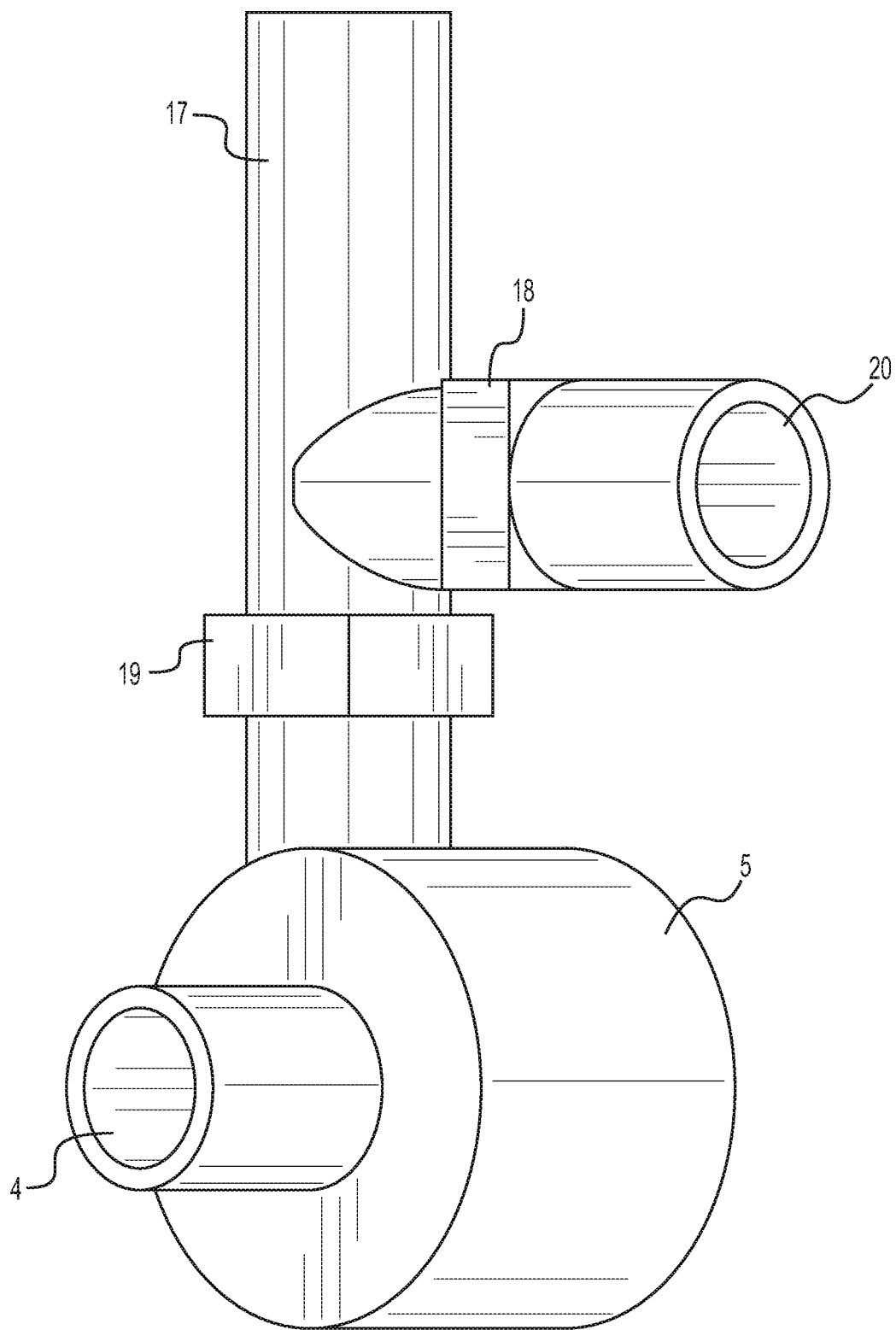
FIG. 6 is an expanded view of an exemplary pump and valve system for controlling the flow of spent oil from the vehicle and the flow of fresh oil into the vehicle, without mixing the spent oil with the fresh oil.

FIG. 6 depicts an expanded view of the pump and valve system as seen in FIG. 5. Conduit (4) serves as the intake and output tube for spent oil and then fresh oil as the robotic machine performs the oil change method steps. The exterior of pump (5) is shown connected. Conduit (17) allows the inflow of fresh oil from a reservoir (not shown), and conduit (20) directs the spent oil to a reservoir. Valve1 (19) and valve2 (18) operate together to ensure that only spent oil enters a spent oil reservoir, while fresh oil is directed into the vehicle only when the spent oil reservoir is closed by a valve1.

Figure 7:
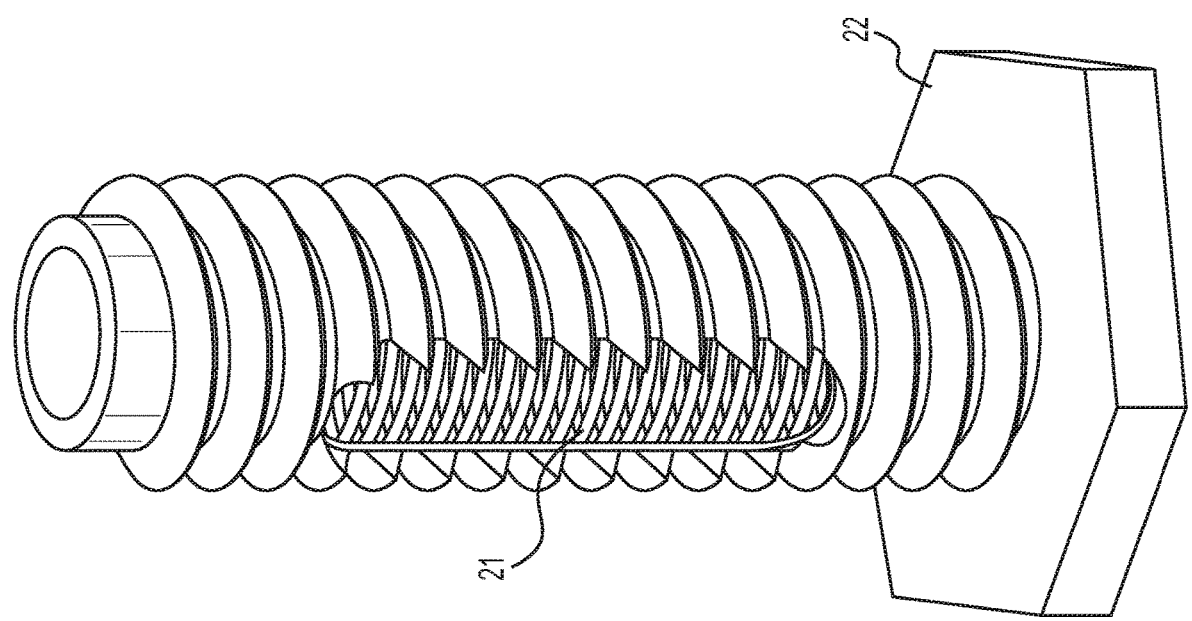
FIG. 7 is a partial cut-away view of an example of the oil drain plug of the invention showing interior features within the hollow center of the drain plug.
Figure 8:
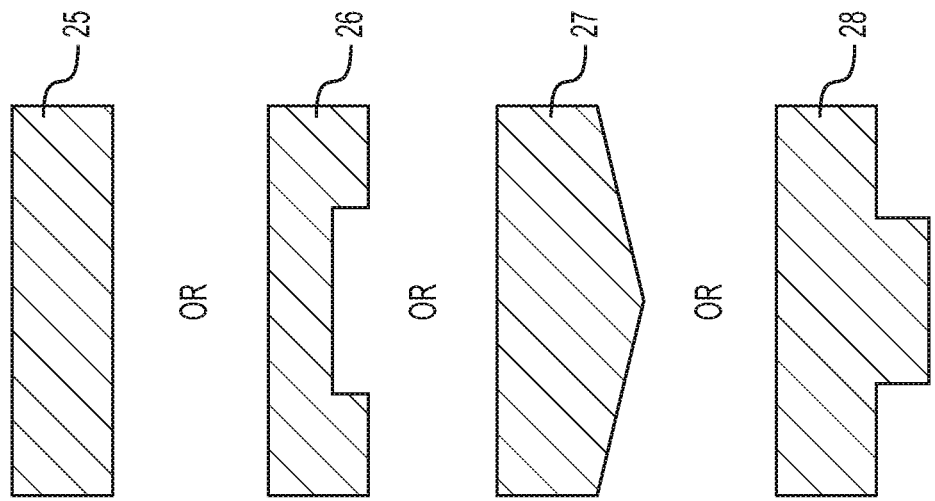
FIG. 8 is a cut-away view of an oil drain plug showing interior features as well as examples of the design options for the seal to the opening of the drain plug.
Figure 8:
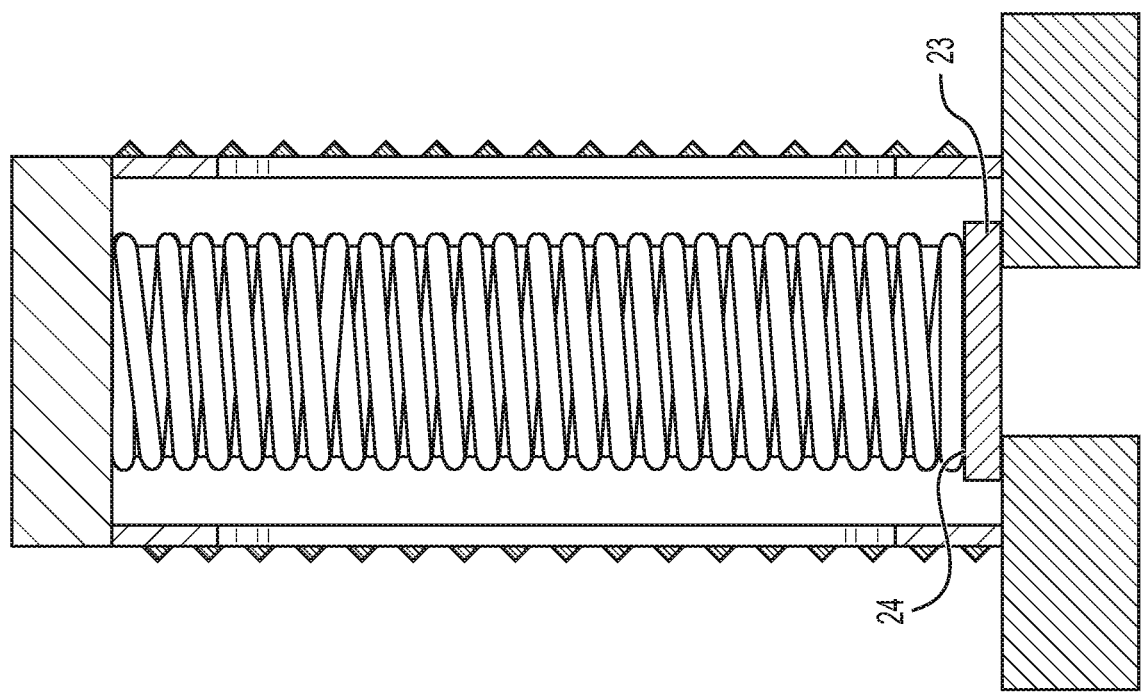

Turning to the drain plug as shown in FIGS. 7-14, various sealing devices or elements can be used to seal the oil in the drain pan of the car when the robotic machine is not operationally placed under the drain pan. When the drainage arm is connected to the drain plug, it engages and releases the seal to allow oil to drain out of the drain pan, and then after to be filled with fresh oil. In FIG. 7, a retention device (21) securely holds the seal against the bolt head (22) section of the drain plug to keep it sealed. A spring is an exemplary retention device (21). FIG. 8 depicts several of the many possible designs for the shape or construction of the seal against the bolt head. For example, a spring is connected at a point (24) to circular seal (23) to cover the opening out of the drain plug. Seal (23) is similar yet not as thick as the second example seal (25), which would operate in the same way. Each of the additional example seals (26), (27), and (28), shown here in cross sectionals views, can be used in conjunction with a bolt head designed to fit the seal and prevent oil from leaking out of the drain pan. At the same time, each seal can be removed from its sealed state in order to allow spent oil to flow out and fresh oil to flow in.

Figure 10:
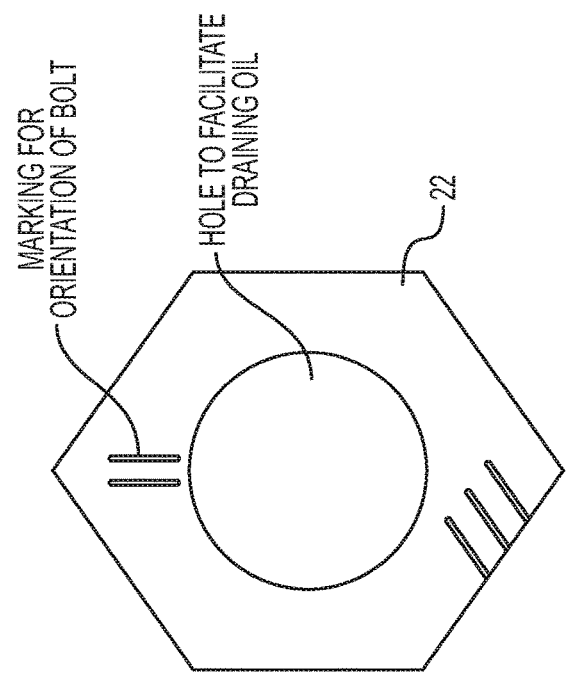
FIG. 10 is a top view of the bolt head section of the oil drain plug showing the hole to the hollow interior for draining oil, and markings for orienting the robotic machine with respect to the drain plug while draining and filling through the tube of the drainage arm.
Figure 9:
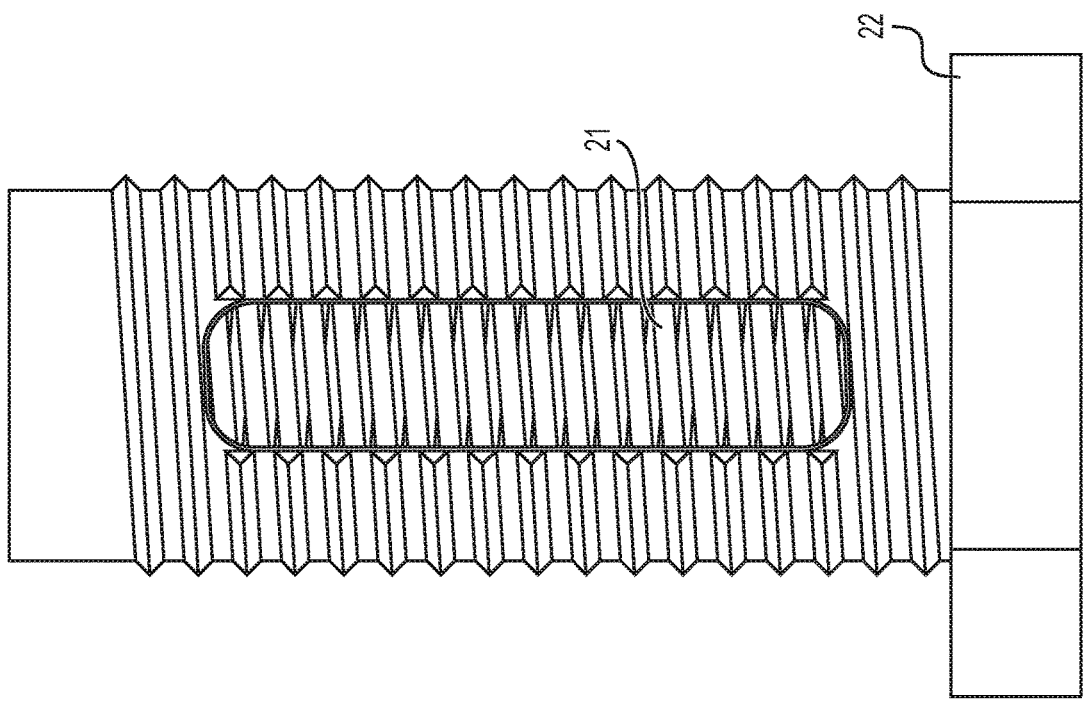
FIG. 9 is partial cut-away view of an example of an oil drain plug showing interior features.
Figure 11:
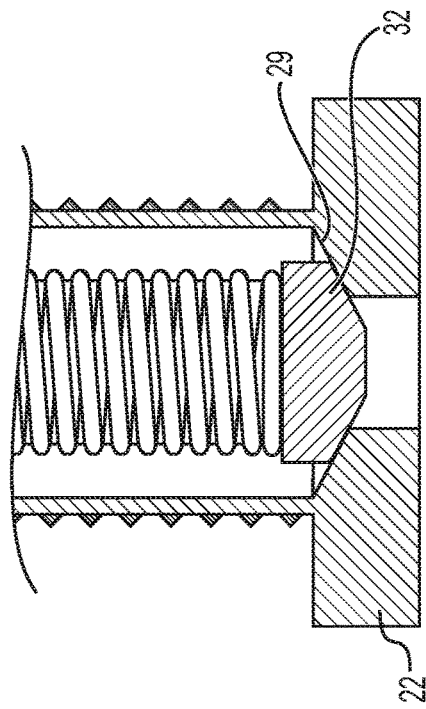
FIGS. 11 through 14 show exemplary designs of the oil drain plug and the mechanism to securely retain the oil in the oil drain pan and at the same time allow access to the oil by the drainage arm mechanism of the robotic machine during the automated draining and replenishing of oil as performed by the robotic machine of the invention.
Figure 12:
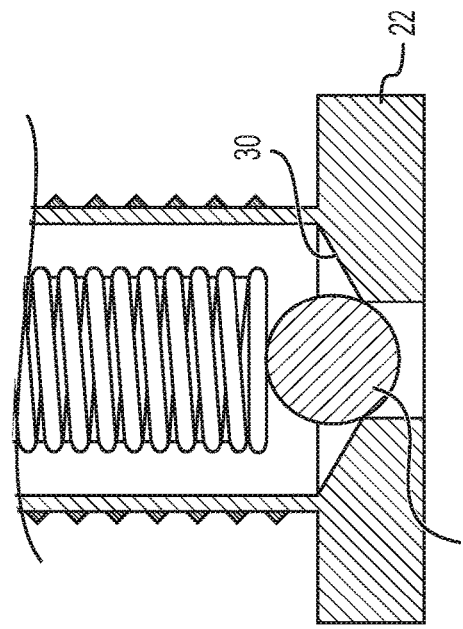
Figure 13:
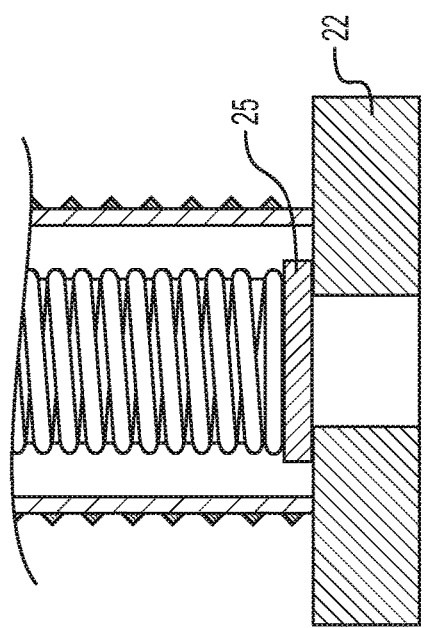
Figure 14:
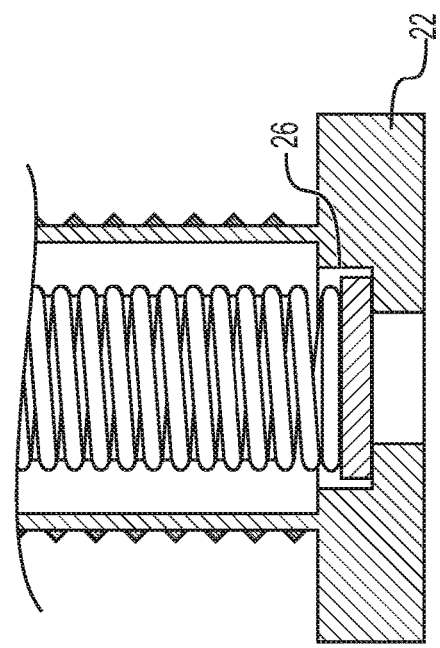

FIG. 9 shows another cutaway view of a drain plug of the invention, where retention device (21), one example being a spring, compresses a seal against the bolt head section (22) of the drain plug. FIG. 10 shows additional, exemplary elements of the bolt head section (22) that allow the robotic machine to employ its camera and/or sensors to accurately position itself under the drain plug. While markings are shown in FIG. 10, various other embodiments can be used, including reflective coatings or marks, grooves on the surface of the bolt head section (22), RFID tags, a washer used in conjunction with the drain plug that comprises a reflective element or RFID or grooves, for example. FIG. 10 also depicts the opening for oil to flow in and out through the interior of the drain plug.

FIGS. 11-14 show some of the possible designs for the seal in conjunction with the corresponding shape of the interior side of the bolt head section (22). The designs shown in FIGS. 11-14 are similar to those shown for just the seal element as shown in FIG. 8. One skilled in the art is familiar with ways to design an appropriate combination of seal and interior surface of the bolt head section in order to prevent leaking oil and allow the oil to flow in and out when the robotic machine engages its drainage arm.

FIGS. 15 and 16 depict an exemplary end tip arrangement for the drainage arm (3) and an exemplary connection between the tip and the drain plug. In FIG. 15, the end of the drainage arm includes an extended tip (34) fitted with a washer (37) to seal against the bolt head (22). The tip includes an orifice (35) through which the fluid flows to drain or fill. The end of the tip (36) is designed specifically for the sealing device used for the drain plug, as shown in the examples of FIG. 8 and FIGS. 11-14. As shown in FIG. 15, the design connects with that depicted in FIG. 11. FIG.

16 shows the tip (36) displacing seal (23) from the bolt head (22) section of the drain plug to allow flow of fluid in and out through orifice (35).

FIG. 16 shows a cutaway view of the end tip of FIG. 15 depressing the retention device (21) in order to move the seal (23) away from bolt head (22). In this configuration, the seal (23) is separated from the bolt head (22) so that fluid can flow in or out through orifice (35). The retention device (21) is shown as compressed in this view, opening the interior of the drain plug at the bolt head (22) end. The interior of the opposite end of the drain plug is always open to the fluid in the drain pan.

The configuration and designs shown in FIGS. 15 and 16 are merely exemplary, and many different connections between the end of the drainage arm and the drain plug can be envisioned and designed for use. The RFID information for a vehicle or drain plug in a vehicle can dictate the type of configuration between the drainage arm and the drain plug. Thus, the robotic machine can be fitted with multiple different extended tip (34) and/or end tips (36) and designs in order to meet all the possible drainage plugs in use for the system. Alternatively, each of a multiple set of robotic machines can have different extended tips (34) and/or end tips (36) that match the connections for all the possible drain plugs available.

In another aspect, a customer identification and processing unit can also store data on or about the TMV associated with each customer, car owner, vehicle type, drain plug used, parking orientation, and any other data that is relevant to the operation of the robotic machine. This can facilitate the locating of the TMV and the correct positioning of the oil change robotic unit.

The method, system, and various apparatus and elements of the invention can operate in the following way. The robotic machine receives information regarding the target vehicle. This information may include the license plate number, the make and model of vehicle, and a time interval during which the vehicle should be serviced. A computer control in communication with the robotic machine may also be used to record this information in its database. Once the target vehicle is designated for a fluid or engine oil replacement, the robotic machine can use the license plate to positively identify the vehicle and the make and model information to help locate the oil drain plug, determine how much oil is expected to drain from the vehicle, and select the correct oil grade to replace the spent oil with. In addition, the vehicle information can be used to specify the ground clearance to the oil drain plug, the location under the vehicle, and the type of drain plug. This information can also be stored in a database of the computer control.

Once the fluid exchange order is confirmed and the robot directed to the target vehicle, the robotic machine autonomously locates the target vehicle. If the vehicle is in a specified location, the robot can follow a fixed route or use a global positioning device to navigate to the vehicle's location. The license plate can be scanned to confirm the correct vehicle identity. As an optional, additional check, if the robot scans a license plate that does not agree with the expected fixed points of the vehicle (wheel base, vehicle type, color, for example), the procedure is aborted and the order returned to the customer with comments. If navigating in an area where there are other vehicles, the robotic machine is marked or otherwise made visible to other cars and pedestrians so they can avoid it.

After correctly identifying the target vehicle, the robotic machine centers itself between the first set of wheels it senses using range sensors (ultrasonic, sonar, radar, lidar, etc.). If the vehicle orientation (backed in vs. pulled in) is known, then the robotic machine will move to the closer set of wheels. If the vehicle orientation is unknown or undeterminable the robotic machine will test possible orientations to move under the vehicle. Once the robot is centered between a set of wheels the robot can position itself beneath the oil drain plug in two steps. The first step is a general location under the vehicle (left or right/forward or backward) from the center between the closer set of wheels. The second step can be a finer location positioning determined by using the identification marking, tag, or other indicator on the drain plug itself or a washer used with the drain plug. As discussed herein, the marking or tag can be visual, magnetic, reflective, or any other indicator that the sensors or camera on the robotic machine can accurately detect to determine the position of the drain plug. One of skill in the art is familiar with techniques, equipment, and protocols for directing a robot as discussed herein to precisely position itself near the drain plug.

The robotic machine is then able to connect itself to the drain plug via the drainage arm (3) by extending it vertically or in the direction dictated by the circumstances to operably connect with the drain plug. The methods of extending the tube vertically may be one or more of the following exemplary methods or apparatus: linear servo motor or actuator; rack and pinion gear; string and motor or linear slide motor; and telescoping tubes. Since the robot may not be directly below the drain plug, the tip of the drain tube may use one or multiple of the following designs: conical tip; magnetic tip; tapered tip; rounded tip. This can facilitate a sealed connection between the drain tube and the drain plug. Optionally, the drain tube may physically attach itself with the drain plug using one or multiple of the following exemplary methods or apparatus: push valve; suction device; threaded end and interior bore of drain plug; magnetic connection. This establishes a liquid tight connection. A feedback actuator can also be used with the drain arm to provide a precise control over the connection to the drain plug.

In one example of the connection to the drain plug, a dedicated drain tube can extend from the drain arm using either an internal apparatus (inside the drain tube) or using the existing external vertical extension system. The drain tube or extension from the drainage arm is moved to depress a ball valve inside the drain plug, thus releasing the fluid held by the vehicle, which drains by gravity. This step may be bypassed if a connection mechanism depresses the ball valve, for example, screwing the drain tube into the drain plug, which creates a liquid tight seal and also acts to release the fluid by depressing the ball valve.

Spent oil is drained into the robot using gravity. This spent oil is optionally located in the upper half of the robot to facilitate pumping fresh oil out from the lowest point in the robot. The amount of spent oil removed is assessed by weight and/or volumetric measurements conducted by the robot either on itself or on the flow of spent oil into itself. A valve or system of valves directs the spent oil into a contained that is separate from that in which the fresh oil is contained to prevent them from mixing.

Fresh oil can then be pumped into the vehicle. The amount of fresh oil added is assessed by weight and/or volumetric measurements conducted by the robot either on itself or on the flow of fresh oil out. A valve or system of valves prevents the oil from being pumped into other compartments within the robot such as the one containing the spent oil.

The robot disconnects itself from the oil drain plug. The robot sends a message that the oil has been changed and proceeds to the next target vehicle. It may optionally drain from itself the spent oil and/or refill itself with fresh oil for the next vehicle change.

The description and examples presented above and the contents of the application define and describe examples of the many combinations, apparatus, and methods that can be produced or used according to the teachings here. None of the examples and no part of the description should be taken as a limitation on the scope of the inventions or of the meaning of the following claims.

What is claimed is:

1. A system for changing the engine oil of a motor vehicle comprising:
    a customer identification and processing unit for storing and transmitting customer identification data;
    a separate, autonomously maneuverable robotic servicing unit in communication with the identification and processing unit, the robotic unit adapted for servicing the vehicle upon receipt of an authorization signal, wherein the robotic unit comprises a tube adapted to be inserted into an existing oil drain plug in the vehicle and a pump for transferring oil, and further comprising storage reservoirs for used oil and one or more types of engine oil;
    a signal communicator for directing the autonomous robotic unit to a vehicle and receiving information from and controlling the robotic unit, and for producing a signal authorizing payment or contacting an account database or approving servicing for the vehicle.

2. The system of claim 1 further comprising an oil drain plug that comprises a sealable opening and hollow interior adapted to allow the flow of fluid from one elongated end of the plug to the other, and wherein the exterior section on one elongated end of the oil drain plug can be connected to a drainage arm of the robotic unit, and wherein the oil drain plug contains in its hollow interior a resistance device to seal a plugging device against the opening of the drain plug when the drainage arm is not connected to the drain plug.

3. The system of claim 1 wherein the tube for inserting into an existing oil drain plug is connected to a drainage arm, and the drainage arm is controlled by a motor on the robotic unit, and the drainage arm further comprises an end tube that can be directed against the oil drain plug to allow the insertion of the end tube into the drain plug.

4. The system of claim 1 wherein the robotic unit comprises multiple reservoirs for holding used oil.

5. The system of claim 1 wherein the robotic unit comprises multiple reservoirs for fresh oil.

6. The system of claim 1 further comprising a rest station for the robotic unit.

7. The system of claim 1 wherein the oil drain plug comprises a tag for allowing the robotic unit to precisely locate the position of the oil drain plug.

8. The system of claim 2, wherein the oil drain plug is adapted to allow a connection with one or more of a set of possible extended tips of the drainage arm on the robotic unit.

9. The system of claim 2 wherein the oil drain plug comprises at least one valve to allow or prevent the flow of fluid.

* * * * *